Figure 1:
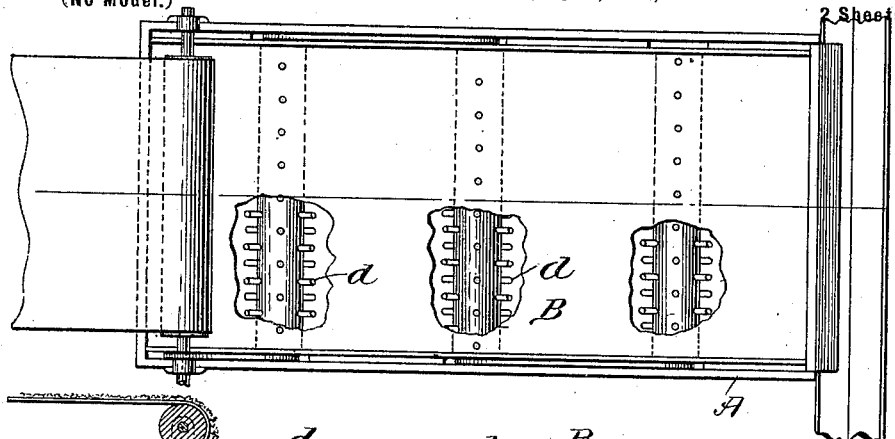

No. 693,684. Patented Feb. 18, 1902.
T. P. BURGESS.
APPARATUS FOR SEPARATING CLEAN FROM REFUSE CHIPS IN THE MANUFACTURE OF WOOD PULP.
(Application filed May 15, 1899.)
(No Model.) 2 Sheets—Sheet 1.

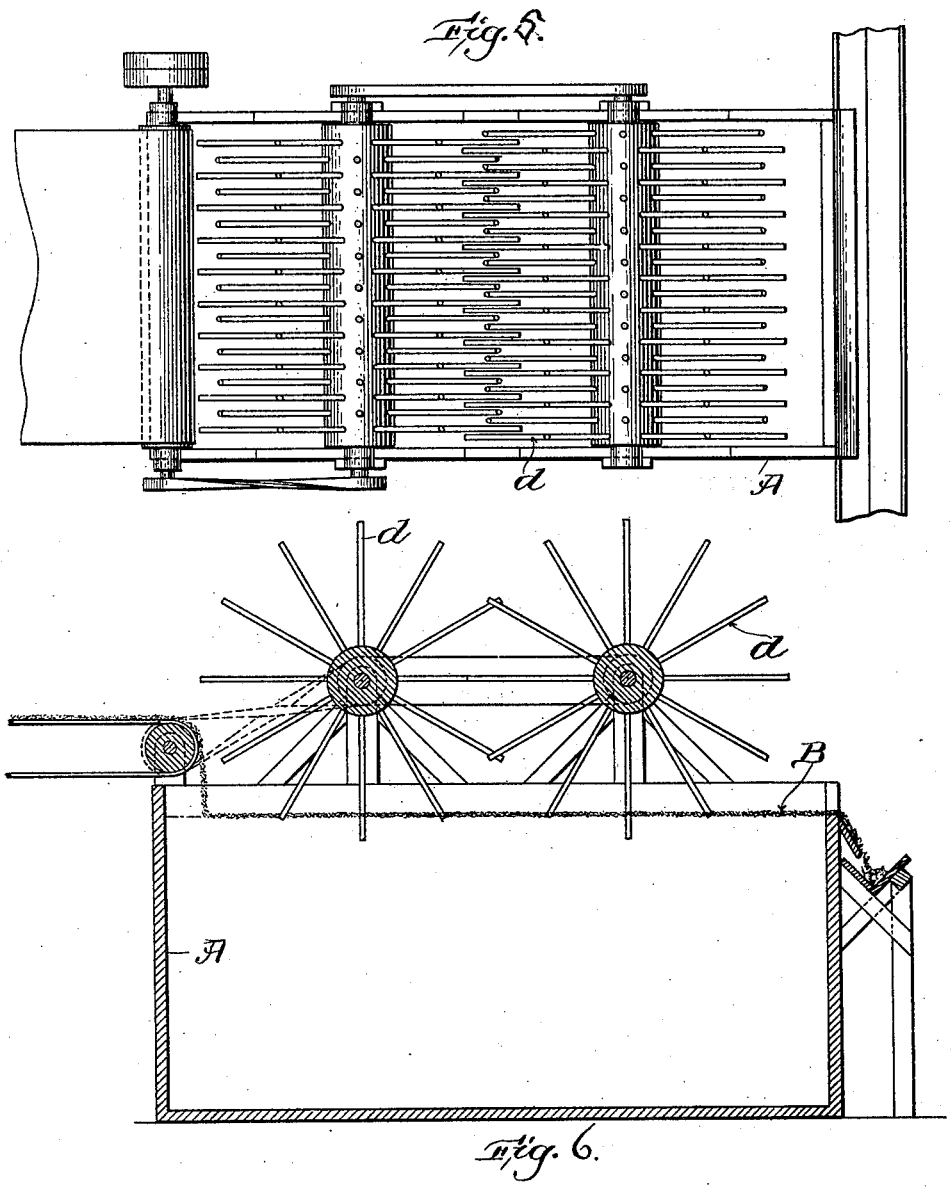

United States Patent Office.

THEODORE P. BURGESS, OF BERLIN, NEW HAMPSHIRE, ASSIGNOR TO THE BURGESS SULPHITE FIBRE COMPANY, OF BOSTON, MASSACHUSETTS, A CORPORATION OF MAINE.

APPARATUS FOR SEPARATING CLEAN FROM REFUSE CHIPS IN THE MANUFACTURE OF WOOD-PULP.

SPECIFICATION forming part of Letters Patent No. 693,684, dated February 18, 1902.

Application filed May 15, 1899. Serial No. 716,840. (No model.)

*To all whom it may concern:*

Be it known that I, THEODORE PHILLIPS BURGESS, of Berlin, in the county of Coos and State of New Hampshire, have invented a new and useful Apparatus for Separating Clean from Refuse Chips in the Manufacture of Wood-Pulp, of which the following is a specification.

In the manufacture of wood-pulp by the sulfite process the wood is first reduced to the form of chips, which are treated in digesters; but before such treatment it is highly desirable that the chips best fitted for treatment shall be separated from those containing knots or pieces of bark or which are for any reason not desirable in the digester, and sundry forms of apparatus are now known for separating the clear chips from the refuse chips.

My invention relates to separating the clear chips from the refuse chips and is based upon my discovery that if a layer of chips be floated upon the surface of the water in a tank and be gently propelled over that surface in a horizontal plane and at the same time gently stirred, so that the floating layer of chips is broken up both in the direction of flow and also in practically all other directions at the same time, the separation of the refuse chips from the clear chips will be made more complete than by any other means known to me.

My theory is that the refuse chips, which are thoroughly mixed with the clear chips, but which constitute only a small part of the bulk of the mixed mass of chips, are prevented from sinking by the buoyancy of the clear chips by which they are surrounded and that only those refuse chips which happen to be unsupported by neighboring clear chips sink; but whether this be the true theory or not it is a fact that when the mixed chips are plunged or forced under the surface of the water many of the heavier refuse chips are so sustained by the lighter clear chips about them that they float off together and the separation is very imperfect, and it is also a fact that when a layer of mixed chips is floated on the surface of the water and gently pushed along that surface in one general direction by frictional propellers, which also act to move the chips of the floating layer relatively to one another without forcing the layer below the surface, practically all of the heavier refuse chips will be dislodged or disengaged from the neighboring lighter clear chips and the lighter clear chips will be prevented from acting as small rafts for the heavier refuse chips, so that practically all the refuse chips will sink.

Although my new principle will be well understood from what has been already said, yet a description by reference to the drawings of the best modes in which I have contemplated applying it is necessary for its full appreciation.

Figure 2:
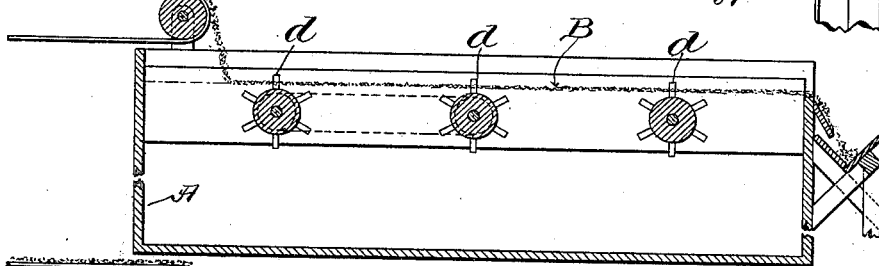
Figure 4:
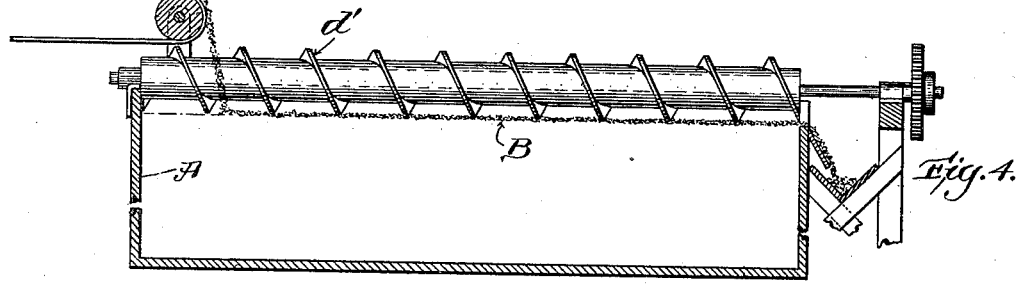
Figure 3:
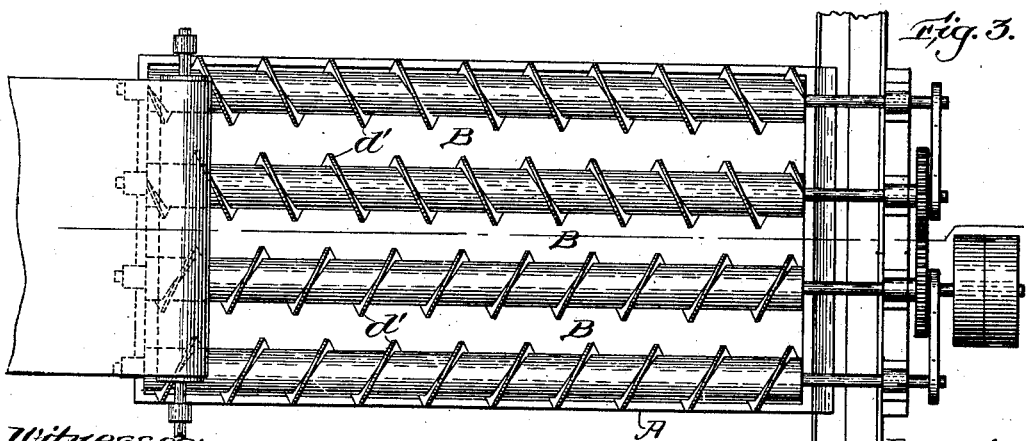

In the drawings, Figures 1 and 2 are a plan and elevation illustrating one form of apparatus embodying my invention; Figs. 3 and 4, like views of another form of apparatus also embodying my invention, and Figs. 5 and 6 like views of a third form of apparatus embodying my invention.

The tank A is as usual and is provided with appropriate means for feeding the chips B and maintaining the water-level, as usual; but the surface of the water is occupied by the rubbing-propellers, which may be fingers $d$, staggered, as in Figs. 1, 2, 5, and 6, or spiral blades $d'$, as in Figs. 3 and 4. These rubbing-propellers move the blanket or layer of chips B over the surface of the water in one general direction, but, in addition, practically each chip is given a motion additional to its general forward motion with the layer, and the combined motion thus given dislodges practically all of the heavier chips from the little rafts formed by lighter chips. The fingers $d$ and the blades $d'$ are moved by revolving the rolls by which they are carried.

It is evident that as the rollers carrying the arms or teeth $d$ are rotated the layer of chips will be broken up in practically all directions, for the chips which are pushed forward by the teeth $d$ will be moved more rapidly than those which are either behind or on either side of them, and they will also usually be thrust aside by the arms with a whirling motion, and at the same time other chips will be carried forward or laterally into the vortices or eddies caused by the passage of the arms through the water. Thus it happens that the floating layer is thoroughly broken up in all directions. This is also the case with the chips when they are subjected to the action of the blades $d'$ in the form of device shown in Figs. 3 and 4. The rollers or shafts upon which the propelling-arms $d$, Figs. 5 and 6, are mounted do not come in contact with the surface of the water, and the layer of chips is therefore allowed to float at all times upon the surface of the water and is at no time submerged. In case these rollers were set so that their lower surfaces were below the surface of the water the layers of chips would necessarily be submerged while passing beneath the rollers and the heavier chips and refuse, which are supported by the lighter chips, acting as rafts, would be held tightly against the body of the rollers by the buoyancy of the lighter chips. The chips would therefore all travel at practically the same speed—viz., the speed of the roller. The teeth upon the rollers at this time would therefore be ineffective toward breaking the heavier chips away from the lighter chips, which buoy them up.

The operation will be plain without detailed description, except that the number of frictional propellers and the area of the surface of the water occupied by them will vary with the thickness and the rate of travel of the floating layer of chips.

In practice it is found that the layer of chips should preferably be from one-quarter to one-half of an inch in thickness and should travel about fifteen or twenty feet per minute.

What I claim as my invention is—

1. An apparatus for separating clear chips from refuse chips, comprising a tank of liquid to receive a floating layer of mixed chips, and propellers acting to push the floating layer of chips in a horizontal plane over the surface of the liquid in one general direction, the said propellers having their propelling-surfaces arranged in a staggered or spiral manner, whereby the chips are moved relatively to one another and the floating layer broken up in practically all directions.

2. An apparatus for separating clear chips from refuse chips, comprising a tank of liquid to receive a floating layer of mixed chips and a stirring device having its body removed from the surface of the liquid and having arms which engage said chips whereby said floating layer of chips is broken up in practically all directions.

THEODORE P. BURGESS.

Witnesses:
W. M. HOFFSES,
E. H. WILLIAMS.